(12) United States Patent
Moretto et al.

(10) Patent No.: US 10,127,146 B2
(45) Date of Patent: Nov. 13, 2018

(54) SYSTEMS AND METHODS TO IDENTIFY AND CLASSIFY PERFORMANCE BOTTLENECKS IN CLOUD BASED APPLICATIONS

(71) Applicant: Cloudy Days Inc., Portland, OR (US)

(72) Inventors: Paola Moretto, Portland, OR (US); Paola Rossaro, San Francisco, CA (US); Shawn Alan MacArthur, Portland, OR (US); Dario Truffelli, Villasanta (IT)

(73) Assignee: Cloudy Days, Inc., Portland, OR (US)

( * ) Notice: Subject to any disclaimer, the term of this patent is extended or adjusted under 35 U.S.C. 154(b) by 113 days.

(21) Appl. No.: 15/135,472

(22) Filed: Apr. 21, 2016

(65) Prior Publication Data
US 2016/0314064 A1    Oct. 27, 2016

Related U.S. Application Data

(60) Provisional application No. 62/150,774, filed on Apr. 21, 2015.

(51) Int. Cl.
| | | |
|---|---|---|
| G06F 11/00 | (2006.01) | |
| G06F 11/36 | (2006.01) | |
| H04L 12/24 | (2006.01) | |

(52) U.S. Cl.
CPC ...... *G06F 11/3688* (2013.01); *G06F 11/3664* (2013.01); *G06F 11/3692* (2013.01); *H04L 41/5035* (2013.01); *H04L 41/5038* (2013.01); *H04L 41/16* (2013.01); *H04L 41/5083* (2013.01)

(58) Field of Classification Search
CPC ............... G06F 11/079; G06F 11/3664; G06F 11/3668; G06F 11/3688; G06F 11/3692; H04L 41/5035; H04L 41/5038
See application file for complete search history.

(56) References Cited

U.S. PATENT DOCUMENTS

| | | | | |
|---|---|---|---|---|
| 7,970,890 | B1 * | 6/2011 | Krivopaltsev | H04L 41/5035 370/241 |
| 9,235,491 | B2 * | 1/2016 | Kimmet | G06F 11/3006 |
| 9,558,465 | B1 * | 1/2017 | Arguelles | G06Q 10/0639 |
| 9,588,820 | B2 * | 3/2017 | Ravi | G06F 9/5072 |
| 9,727,449 | B2 * | 8/2017 | Hermeto | H04L 41/5038 |
| 2004/0059544 | A1 * | 3/2004 | Smocha | G06F 11/3409 702/182 |
| 2007/0185984 | A1 * | 8/2007 | Roth | G06F 11/3688 709/223 |
| 2008/0133435 | A1 * | 6/2008 | Chintalapti | G06F 11/3409 706/12 |

(Continued)

*Primary Examiner* — Marc Duncan
(74) *Attorney, Agent, or Firm* — McCoy Russell LLP

(57) ABSTRACT

Described herein are systems and methods of identifying and classifying performance bottlenecks for web applications. Such systems and methods use classification and analysis of performance testing data and data instrumentation via arithmetic and/or machine learning. Data is integrated from different sources including system data, historical and real time sources. Performance variations are analyzed as load changes and the impact of these variations on different sectors of the Application stack are analyzed. Bottlenecks are identified and classified based on the sector in the software stack and recommendations for optimization of an Application under Test are presented to address the bottlenecks are presented.

12 Claims, 13 Drawing Sheets

(56) References Cited

U.S. PATENT DOCUMENTS

| | | | | |
|---|---|---|---|---|
| 2013/0054792 A1* | 2/2013 | Sharaf | ............ | G06F 8/20 |
| | | | | 709/224 |
| 2014/0215077 A1* | 7/2014 | Soudan | ............ | H04L 47/11 |
| | | | | 709/226 |
| 2015/0222494 A1* | 8/2015 | Broda | ............ | H04L 41/22 |
| | | | | 715/736 |
| 2015/0347268 A1* | 12/2015 | Garrett | ............ | G06F 8/443 |
| | | | | 714/47.2 |
| 2015/0358391 A1* | 12/2015 | Moon | ............ | H04L 67/10 |
| | | | | 709/224 |
| 2016/0098341 A1* | 4/2016 | Pho | ............ | G06F 11/3688 |
| | | | | 714/38.1 |
| 2016/0366029 A1* | 12/2016 | Gardner | ............ | H04L 41/22 |

\* cited by examiner

SYSTEMS AND METHODS TO IDENTIFY AND CLASSIFY PERFORMANCE BOTTLENECKS IN CLOUD BASED APPLICATIONS

CROSS-REFERENCE TO RELATED APPLICATIONS

This Application claims benefit of U.S. Provisional Patent Application No. 62/150,774, filed Apr. 21, 2015, the entirety of which is incorporated herein by reference.

BACKGROUND

In the cloud, computing resources often appear as a homogeneous pool. In reality, computing resources are a variety of different servers, computing, storage, networking and data center operations, all of which may be managed by the cloud provider. The cloud is typically device and location independent in that a user may not know the actual device or location where a component or resource physically resides. Components may access resources, such as processors or storage, without knowing the location of the resource. The provisioning of the computing resources, as well as load balancing among them, is the responsibility of the cloud service provider. This reliance on outsourced resources makes it difficult for companies deploying their applications to differentiate between issues with the cloud service provider and performance issues of their applications under high traffic/data scenarios. It also makes it challenging to stress test their applications under different scenarios.

Increasing amounts of data are stored in a distributed manner. While high traffic/data scenarios can be reproduced with hardware and simulations, testing using hardware requires a large amount of hardware infrastructure and is expensive. Current solutions require measuring run-time of each individual operation or line profiling which is slow and inefficient, particularly for large programs. In order to obtain meaningful data, companies have to use different independent tools, and integrate and process huge amounts of data to obtain a modicum of information the areas that are causing performance issues with their Application. It can also be difficult to discern whether an issue is with the cloud service or the Application. There is therefore a need for better performance testing solutions for cloud-based applications.

BRIEF SUMMARY

Performance bottlenecks in cloud based applications can be difficult to isolate. They may occur in the system in which an Application is operating, in connections between the system and the Application, between the Application and third party plug-ins, and/or within the Application itself. Data regarding a bottleneck may occur in a variety of different formats, languages, and at different time points during the performance of an Application increasing the complexity of interpreting results received. Additionally, critical values (critical response time delays) may vary for different parts of an Application, e.g. a response time for connection with a browser may be different than the expected response time for an internal Application operation and performance bottlenecks may occur at different time points during the execution of an operation increasing the complexity of identifying relevant data and whether a response time delay is normal, of note (warning), or critical.

In some embodiments, a system for identification and classification of performance bottlenecks in web applications may include a test execution module. Such a test execution module may generate synthetic traffic or set up the necessary hardware and software infrastructure required to execute a performance test on an Application under Test. The test execution module may run a performance test on an Application under Test and collect raw data from the execution of the performance test. A system for identification and classification of performance bottlenecks in web based Application may further include at least one data instrumentation system which collects system data and generates mapping schema based on the metrics that the system provides and the logical components that make up the stack and cloud infrastructure. Such mapping schema may be recorded and/or automated and applied to the raw data received at the same or a later time point in the analysis of the system.

A system for identification and classification of performance bottlenecks in web based applications may further include a pre-processing module which groups the raw data from the data instrumentation system, the performance test, and historical data into functional groups based on the mapping schema and maps them to the specific metric or metrics representative of the functional groups' role in system timing and performance. For example, such metrics may include, but are not limited to, database timing, browser timing, virtual machine timing, Application timing, plug-in timing, server timing, bandwidth, CPU utilization, network timing, network performance parameters, memory performance, cache utilization, disk usage, load balancer metrics, CDN metrics, storage metrics or any other relevant network or Application stack parameters. In some embodiments, pre-processing may additionally include normalizing the raw data from the performance test and the data instrumentation system to match timing. Such normalization may include conversion to the same units of time, the same length of time, limitation to the length of the performance test, or other types of timing normalization which would enable the groups of data to be compared.

The system may further comprise an analytics processing module which compares the data in the functional groups assembled by the pre-processing module and identifies a threshold of a relevant metric associated with the performance bottleneck. In some embodiments, systems variations related to performance variations during the performance test are determined by calculating a correlation between metrics and average page load time and taken into consideration during processing and determining relevant thresholds. Critical values for response time may be inputted directly by a user or automatically calculated as a fraction of the total variation of the response time during the length of a performance test. The relevance of a metric may be determined by comparing the threshold of a particular metric with the critical response time. The relevance of a metric could be determined either through an analytical approach or through heuristic methods of machine learning with metrics determined to be of low relevance discarded from further calculations. The metrics identified as relevant may then be used to develop a mathematical multivatiate predictive model of the response time. Through this model, the threshold values of the variables associated with critical level response times are identified. In some embodiments, the analytics processing module may include a group of classification modules which generate baseline parameters, compare the data instrumentation system data and the performance test data with historical data, identify candidates for bottlenecks, and/or identify a sector in the Application under Test that are impacted by changes in traffic load. The system for identification and classification of performance bottlenecks in web based applications may further include a display mechanism that displays a graphical representation such as a heatmap of the performance bottlenecks along with the status of metrics at different time points during the running of a performance test on an Application under Test and recommendations for optimizing performance of the Application under Test.

In some embodiments, a method of identifying performance bottlenecks in web Applications under test may include collecting system data from one or more Data Instrumentation Systems; collecting performance metrics from an Application under Test; grouping the system data, the performance data and historical data in functional groups based on predefined mapping schemas generated by the one or more Data Instrumentation Systems; determining if average response time alters with increasing load; determining if systems data affected performance; determining metrics relevant for response time increases; identifying a sector of the Application under Test relevant for response time increases; evaluating critical load levels; and/or outputting a graphical representation of bottlenecks such as a heatmap and recommendations for optimizing the performance of the Application under Test. The system data from the Data Instrumentation Systems may be collected by the same or different means for each data instrumentation system. In some embodiments, the system data is retrieved from an API. Given system variations over time, in some embodiments, a correlation between metrics and average page load time are calculated to identify system variations related to system performance variations during the test and if the effect on the metric is an issue of the system or the Application under Test.

In some embodiments, a method for detecting performance bottlenecks in an Application under Test may include running a performance test on the Application under Test; initiating a test execution module which generates local and/or global synthetic traffic according to a pre-selected traffic pattern such as, but not limited to, high flat, linear ramp, or sharp peak, generates or instructs the generation of specific workloads for a predefined duration of time, and selects variability of visit duration and hit time. The method may further comprise collecting performance data from the performance test; collecting system data from at least one data instrumentation system; grouping system data, performance data and historical data based on mapping schemas generated by at least one data instrumentation system based on metrics that the system provides and logical components that make up the system stack and cloud infrastructure; comparing historical data to system data and performance data and determining if average response time alters with increasing load; identifying a sector of the Application under Test relevant for response time increases; and/or outputting a graphical representation of bottlenecks in both the system and/or Application under Test and recommendations for optimizing performance of the Application under Test.

To the accomplishment of the foregoing and related ends, certain illustrative aspects of the system are described herein in connection with the following description and the attached drawings. The features, functions and advantages that have been discussed can be achieved independently in various embodiments of the present disclosure or may be combined in yet other embodiments, further details of which can be seen with reference to the following description and drawings. This summary is provided to introduce a selection of concepts in a simplified form that are elaborated upon in the Detailed Description. This summary is not intended to identify key features or essential features of any subject matter described herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
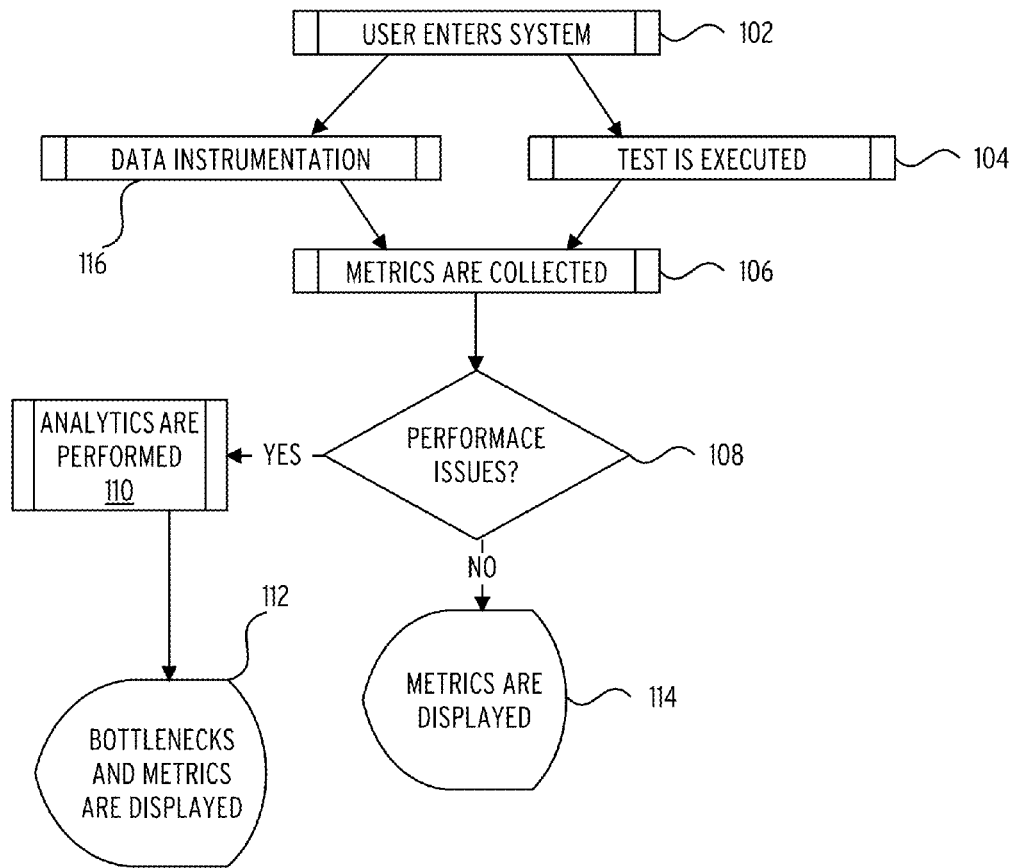
FIG. 1 is a block diagram of a user workflow of a cloud based performance analytic system.

"Active merchant" in this context refers to a Ruby library for dealing with credit cards and payment processors.

"Application Program Interface (API)" in this context refers to is a set of routines, protocols, and tools for building software applications that specifies how software components should interact.

"Asynchronous JavaScript and XML (Ajax)" in this context refers to a method of building interactive applications for the Web that process user requests immediately, allowing web applications to send and receive data asynchronously (in the background) without interfering with the display and behavior of the existing page.

"Bottleneck" in this context refers to the delay in transmission of data through the circuits of a computer's microprocessor or over a TCP/IP network.

"Cloud" in this context refers to device resources delivered as a service over a network (typically the Internet).

"Collector" in this context refers to a class of methods which retrieves both the type of data available about the performed test and the values of that data. It takes and combines raw data with data system instrumentation information and then saves it to a database.

"Connection time" in this context refers to the time, in seconds, that it takes to connect to a web server across a network.

"Database" in this context refers to an organized collection of data (states of matter representing values, symbols, or control signals to device logic), structured typically into tables that comprise 'rows' and 'columns', although this structure is not implemented in every case. One column of a table is often designated a 'key' for purposes of creating indexes to rapidly search the database.

"DNS time" in this context refers to the time it takes a web browser to translate a hostname to its corresponding IP address.

"Elastic load balancing" in this context refers to a load balancing solution that automatically scales its request-handling capacity in response to incoming application traffic.

"Extensible Markup Language (XML)" in this context refers to a markup language that defines a set of rules for encoding documents in a format which is both human-readable and machine-readable.

"Firmware" in this context refers to logic embodied as read-only memories and/or media.

"Hardware" in this context refers to refers to logic embodied as analog and/or digital circuits.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Machine-learning" in this context refers to a branch of artificial intelligence in which a computer generates rules underlying or based on raw data that has been fed into it. It facilitates the continuous advancement of computing through exposure to new scenarios, testing and adaptation, while employing pattern and trend detection for improved decisions in subsequent (though not identical) situations.

"Memcache" in this context refers to a general-purpose distributed memory caching system.

"Method" in this context refers to a term used in object-oriented programming (OOP) to indicate a procedure associated with an object.

"Middleware" in this context refers to the software layer that lies between the operating system and the applications on each side of a distributed computer network.

"Ruby on Rails" in this context refers to is a web application framework written in Ruby under MIT License. Rails is a model-view-controller (MVC) framework, providing default structures for a database, a web service, and web pages. It encourages and facilitates the use of web standards such as JSON or XML for data transfer, and HTML, CSS and JavaScript for display and user interfacing.

"RubyVM" in this context refers to Ruby Virtual Machine, a simple stack machine which runs pseudo sequential instructions.

"Software" in this context refers to refers to logic that may be readily readapted to different purposes (e.g. read/write volatile or nonvolatile memory or media).

"SSL Time" in this context refers to time, in seconds, that it takes to establish a Secure Socket Layer (SSL) connection and exchange SSL keys.

"Stack" in this context refers to an abstract data type that serves as a collection of elements with a bounded (pre-defined) capacity. It is a simple data structure that allows adding and removing elements in a particular order.

"Synthetic user" in this context refers to a virtual user that operates externally to the system and mimics real user behavior by running through user paths on the website or application.

"Uniform Resource Identifier (URL)" in this context refers to the global address of documents and other resources on the World Wide Web. The URL uses a protocol identifier and a resources name where the resources is located. The URL format is specified in RFC 1738 Uniform Resource Locators (URL).

"Web application" in this context refers to is an application program that is stored on a remote server and delivered over the Internet through a browser interface.

"Web page" in this context refers to a file configured for access and display via a web browser over the Internet, or Internet-compatible networks. Also, logic defining an information container that is suitable for access and display using Internet standard protocols. Content defined in a web page is typically access using a web browser and displayed. Web pages may provide navigation to other web pages or content via hypertext links. Web pages frequently subsume other resources such as style sheets, scripts and images into their final presentation. Web pages may be retrieved for display from a local storage device, or from a remote web server via a network connection.

DESCRIPTION

Application performance bottlenecks can occur in a variety of different places and for a variety of different reasons such as, but not limtied to, problems with the CPU, disk, network, memory, lock contention, external resources, databases, web service and the like. Bottlenecks may also occur due to management of the cloud services resources by the cloud services provider. When using cloud based resources to run an Application, it may be difficult to determine where a bottleneck is occurring and whether the bottleneck is Application or network based.

Described herein are systems and methods for identifying and classifying performance bottlenecks in both networks and the software stack of cloud based applications. In some embodiments, the methods described herein include a mathematical and/or machine learning approach that provides interpretation and correlations of data to identify areas in the software stack where the bottleneck has occurred. The systems and methods measure and analyze user performance data derived from a variety of sources including performance tests on an Application under Test, and combine them with system and infrastructure information to provide end-to-end analysis, classification, and location of the bottlenecks. Information regarding the bottlenecks may be displayed in any format that provides useful information. In some embodiments, it may be displayed graphically such as in a heatmap along with suggestions as to means for optimizing an Application under Test and removing the bottlenecks in the Application under Test.

Performance tests may be created by any means generally used. In some embodiments, they may be created from recorded browser transactions such as those described in U.S. patent application Ser. No. 15/094,994 filed Apr. 8, 2016. In other embodiments, they may be created by generating web-load on demand using synthetic users for specified or pre-determined durations of time according to specific traffic models using systems such as those described in U.S. patent application Ser. No. 14/830,068 filed Aug. 19, 2015, both of which are incorporated herein by reference in their entirety.

In some embodiments, performance tests may be executed by a test execution mechanism. The test execution mechanism may be made of one or more modules which may be independent of each other. For example, in some embodiments, the test execution module may include a configuration module, master module, client instance module and job creation module as described in further detail in U.S. patent application Ser. No. 14/830,068, filed Aug. 19, 2015, incorporated herein by reference in its entirety. In some embodiments, requests for test execution may be transmitted to a plurality of traffic generator computers. Each traffic generator computer is responsive to a timer control and applies traffic model logic to generate the programmed amount of traffic specified by either the replaying module or as part of the recorded transactions in the form of synthetic users in cooperation with an elastic load balancer. The traffic generator computers generate specific workloads for a predefined duration of time, and select variability of visit duration and hit time. The master module may receive requests from the front end, send requests for configuring the module, verify the information is correct, send requests to a job creation module and communicate the results to a display along with recommendations for optimizing the Application under Test. The results of any particular performance test may be tagged or otherwise labeled with a unique, searchable identifier and either discarded or stored in cloud based storage resources.

As shown in FIG. 1, a user enters the system at 102 and a performance test is executed at 104. The test generates random or pre-selected synthetic traffic on the Application under Test and collects metrics 106 from the test execution 104. It also collects system data from the data instrumentation system(s) 116. A determination is then made as to whether performance issues are detected in the Application under Test. If no performance issues are detected in the Application under Test, then only the metrics are displayed 114. If there are performance issues as the load changes that are identified as critical by either direct input from the user or automatically as a fraction of the total variation of the response time during the entire loading range, performance analytics are performed 110 and the relevant metrics and their threshold values associated with the critical performance issue are identified. The relevance of the metrics may be evaluated through an analytical approach using mathematical instruments for the calculation of the correlation or the methods of logitudinal analysis or through a heuristic method of machine learning (research of recurrent association between the metrics of the methods and the metrics of the response time). The metrics identified as relevant may be used to develop a mathematical multivariate predictive model for the response time, identifying threshold values of the metrics associated with critical response time. Once the location of the performance issues are located, the performance bottlenecks and metrics are displayed 112.

Figure 2:
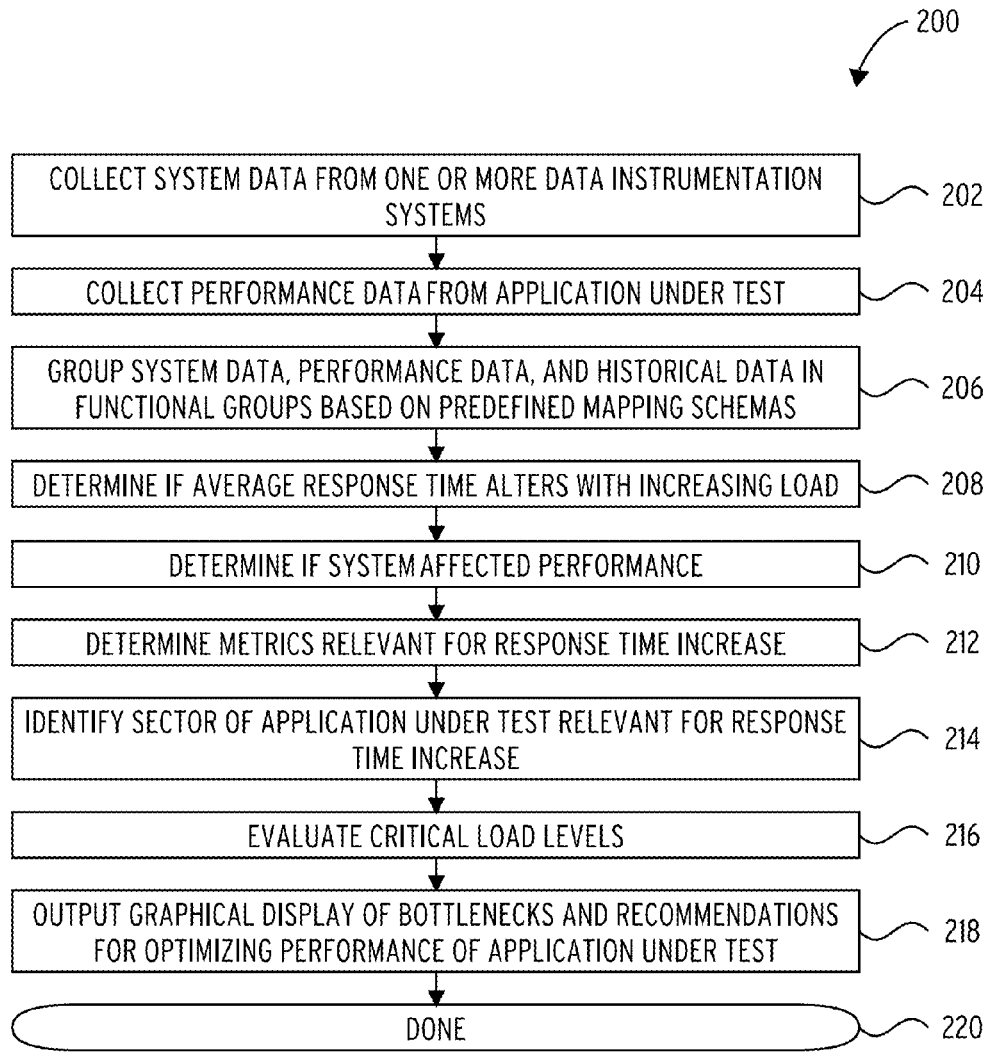
FIG. 2 is a flowchart of a means for identifying bottlenecks in web based applications.

As shown in the flow chart in FIG. 2, system data is collected from one or more Data Instrumentation Systems 202. Performance data from a performance test are collected from a performance test run on an Application under Test 204. The system data, performance data and historical data are grouped into functional groups based on mapping schemas 206 created by Data Instrumentation Systems. Once a Data Instrumentation System is added to the system of the Application under Test, a mapping schema is created based on the metrics that the Data Instrumentation System(s) provides and the logical components that make up the stack and cloud infrastructure. Once the mapping schema is created it can be automated and applied to any data received. Metrics in the mapping schema may include, but are not limited to, a plurality of representatives of system timing and performance including, but not limited to, database timing, browser timing, virtual machine timing, application timing, plug-in timing, server timing, bandwith, CPU utilization, network timing, network performance parameters, memory performance, cache utilization, disk usage, load balancer metrics, CDN metrics, storage metrics as well as other network parameters and application stack parameters. Metrics may comprise some or all of these metrics in any combination or amount desired by the user including several thousands of available metrics.

After the system data, performance data, and historical data are grouped into functional groups based on the mapping schemas, it is determined whether the average response time of the Application under Test alters with changes in load at 208. If it is determined that response time alters, then a determination is made as to whether performance of the Application under Test was affected by the systems data 210 or a metric associated with the Application under Test 212 or both. The identity of the relevant sector of the Application under Test responsible for the response time increase is identified 214 and the critical load levels are determined 216. A graphical display of bottlenecks and recommendations for optimizing performance of the Application under Test is then displayed 218 and routine 200 ends at done block 220

Figure 3:
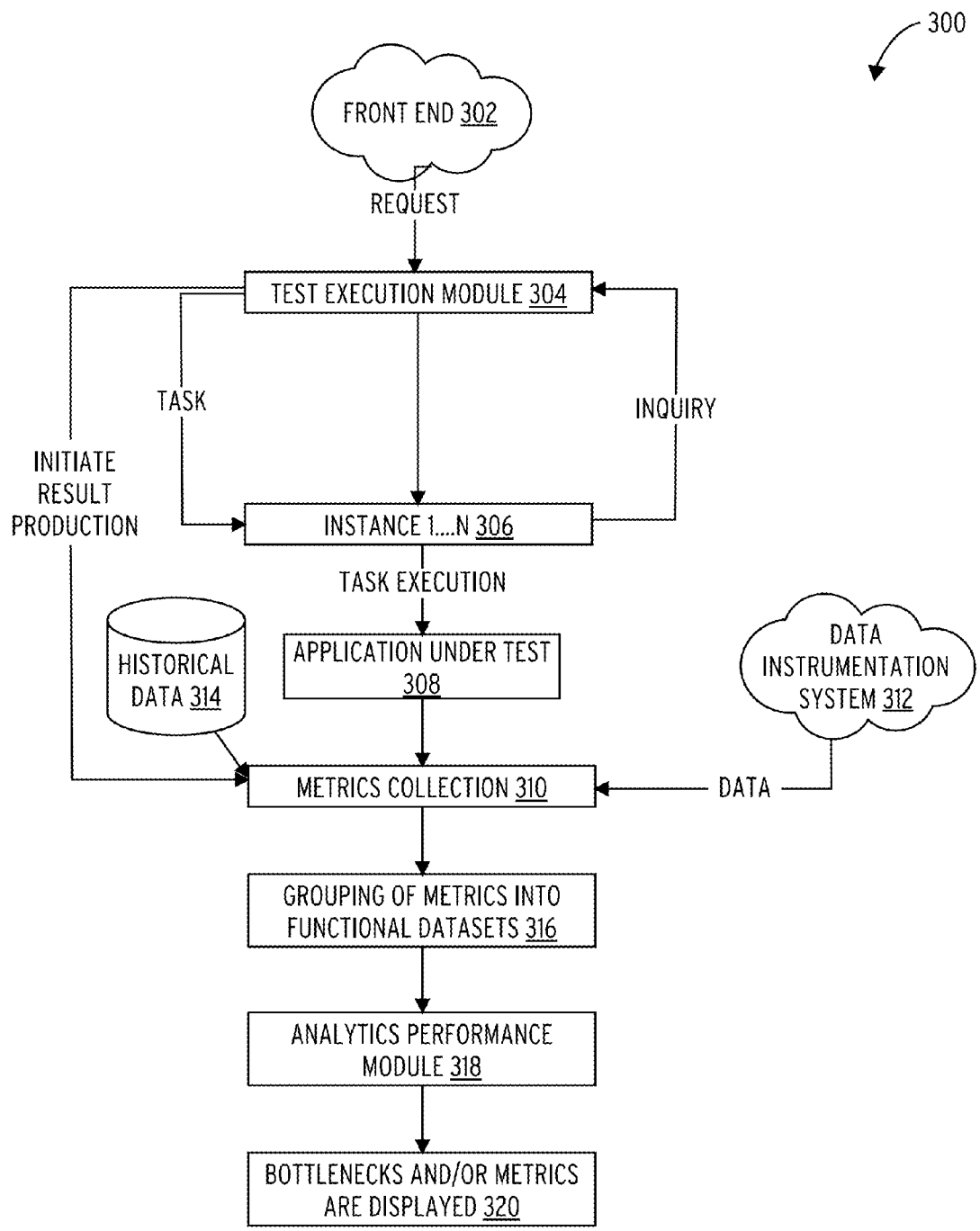
FIG. 3 illustrates an aspect of an execution of a performance test and determination of performance issues within an Application under Test.

FIG. 3 is a diagram of an embodiment of a system for performance testing cloud based applications including a test execution module. The Front end 302 sends a request to the test execution module 304 to run a performance test. In response, the test execution module 304 sets up the necessary hardware and software infrastructure required to execute the test request. The test execution module 304 receives an inquiry signal from instance 1 . . . n 306 and in response checks the task queue for requested jobs. If a task is in the task queue, it is sent to the instance. The instance 1 . . . n 306 receives a task signal from the test execution module 304 and in response runs the task on the Application under Test 308. Results from the task execution are collected in metrics collection 310 along with system information collected from data instrumentation system 312 and historical data 314. The collective metrics are grouped into functional datasets 316 and analytics are performed by analytics performance module 318 to determine areas from the performance test and system data identified as critical issues. The identification of what constitutes a critical response time may be determined either by direct input from the user or automatically as a fraction of the total variation of the response time during the test run. Analytics performance module 318 identifies the relevant metrics and their threshold values associated with the critical response time issue. The relevance of the metrics may be evaluated through an analytical approach, calculating the correlation or the methods of logitudinal analysis or through heruistic methods of machine learning. The metrics identified as relevant are then used to develop a mathematical multivariate predictive model for the response time. The threshold values of the metrics associated with the critical response time issues are therefore identified and the results including Bottlenecks and/or metrics are displayed 320.

Figure 4:
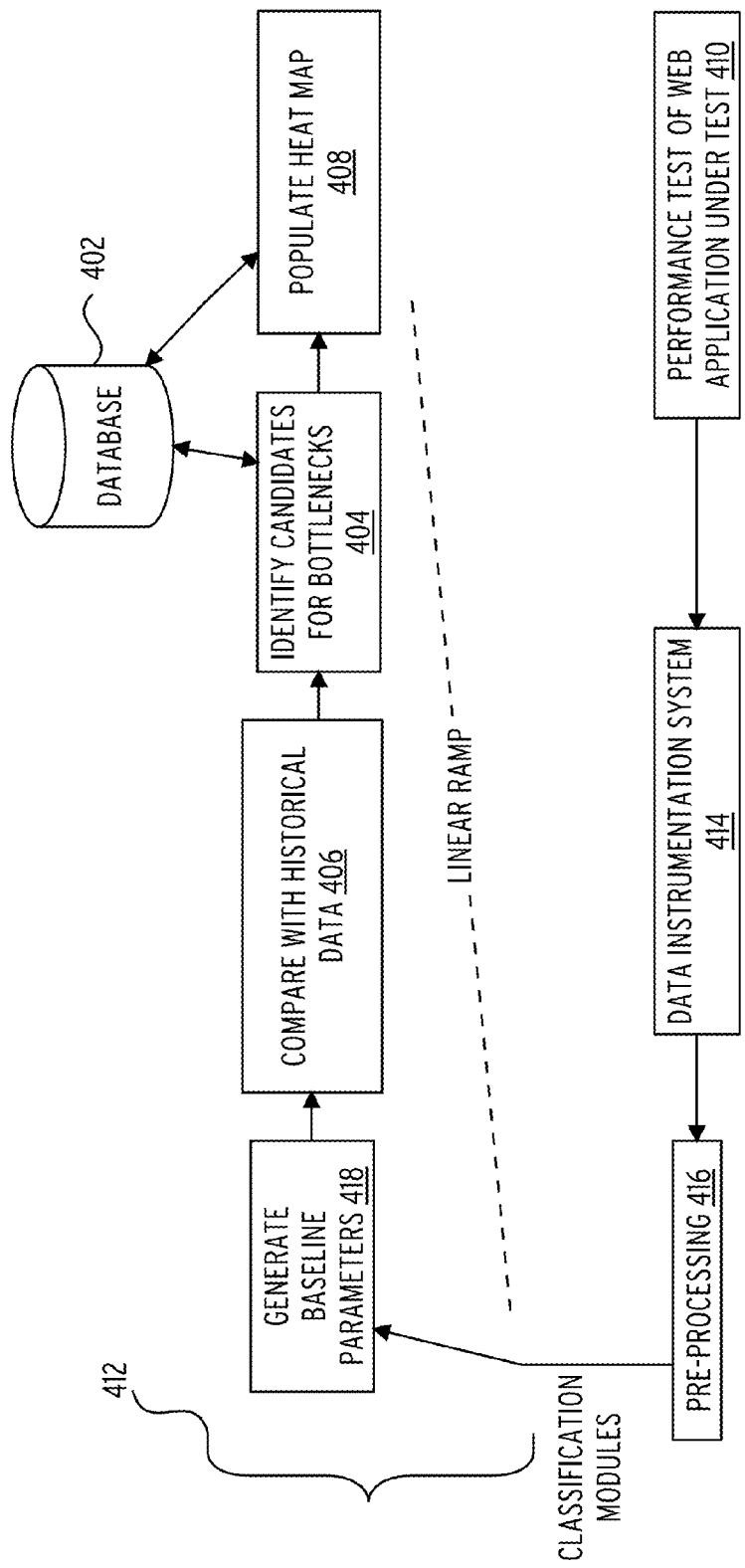
FIG. 4 is a block diagram of an example of a system using machine-learning according to an embodiment described herein.

As shown in FIG. 4, a performance test is run on a Web Application under Test 410. Such a performance test may include one or more user traffic patterns. The type of traffic generated may be created by the user or chosen from predefined patterns including, but not limited to, high flat in which the webload stays the same throughout the duration of the test, linear ramp in which the traffic grows linearly for the duration of the test, sharp peak in which the traffic shows a burst during the test execution and then returns to the normal state, and the like. In some embodiments, internet traffic models may be based on network state variables, policy variables, and decision variables. In other tests, certain parameters may be randomized. For example, a test may start with a linear ramp and then flatten out, or the number of synthetic users may change periodically. In some embodiments, the synthetic users may be generated via software and generate real traffic against the Application under Test according to a plurality of traffic models and durations. The number of synthetic users generated in the cloud can be increased or decreased according to the parameters defined by the user running the tests. Synthetic users generate real traffic (web-load) against the Application under Test. Each test and/or run of a test may be saved in a test database and assigned a unique identifier. FIG. 4 shows an exemplary linear ramp test. Information is additionally collected from one or more Data Instrumentation Systems 414 which are modular and programmable via API. The data instrumentation system 414 collects thousands of different metrics that are representations of system timing and performance. In some embodiments, these metrics are database timing, browser timing virtual machine timing, application timing, plug-in timing, and server timing. In other embodiments, other network parameters and application stack parameters are collected. In further embodiments, the data instrumentation system 414, may collect a combination and/or subset of these and additional system timing and performance metrics.

Information from the data instrumentation system 414 and the performance test of the web Application under Test 410 are integrated for pre-processing 416. The raw data is then grouped into functional groups. The functional groups are based on predefined mapping schemas based on the data instrumentation system. In Classification Modules 412, baseline parameters 418 including thresholds and ranges may be generated from one or more collections of data from the data instrumentation system 115 and the performance test of the web Application under Test 410. The baseline parameters 418 from the performance test 410 and the data instrumentation system 414 are then compared with historical data 406. Candidates for bottlenecks 404 are then identified and the information stored in a Database 402 and a heat map 408 or other graphical representation of the location of the bottlenecks is generated and may also be stored as in Database 402 if desired.

Figure 5:
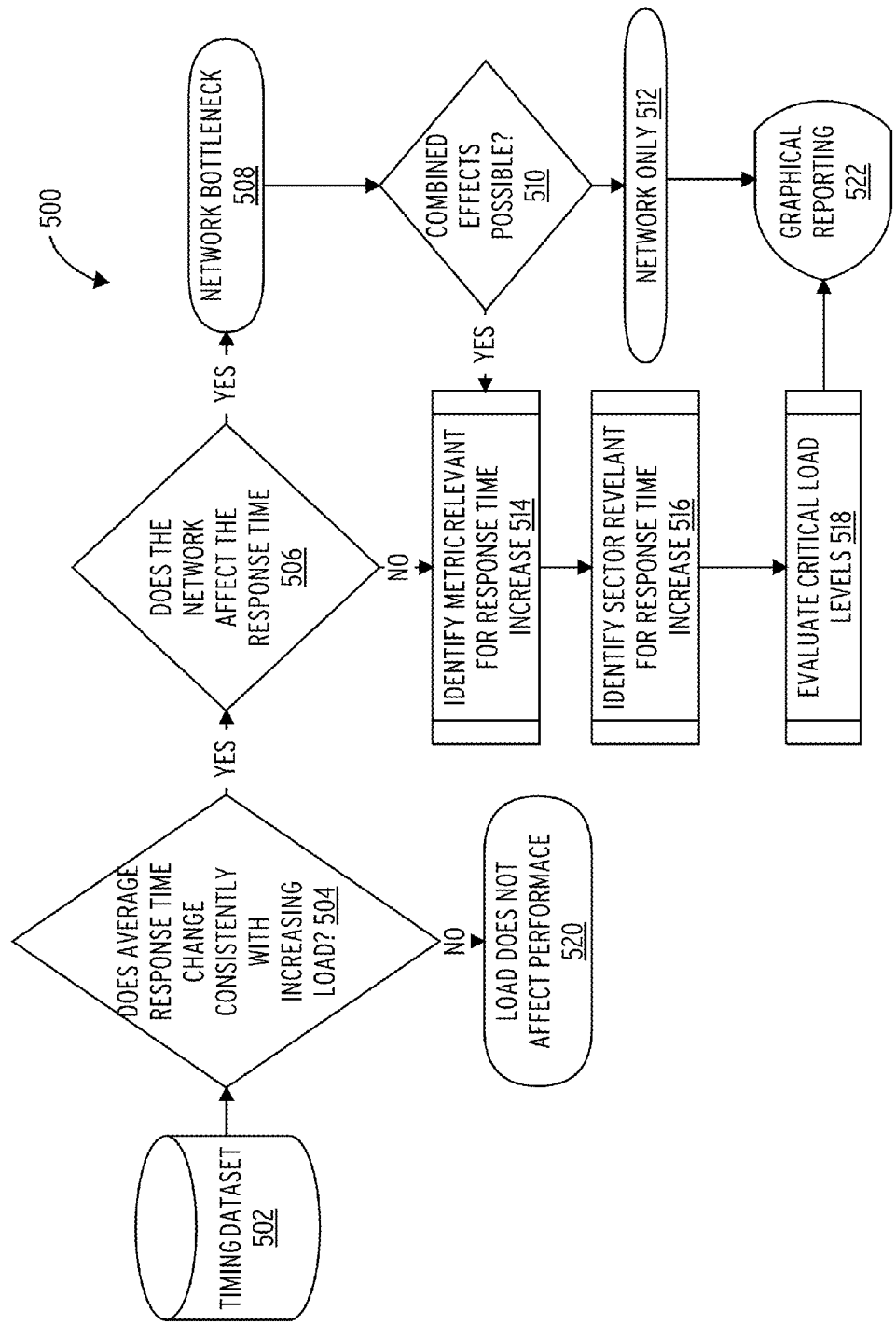
FIG. 5 is a block diagram representing an embodiment of a method for identifying bottlenecks in an Application under Test.

As shown in FIG. 5, within the classification modules, data collected by the data instrumentation systems 414 and performance test of the Application under Test 410 are assembled into a timing dataset 502 in pre-processing. It is then determined at 504 as to whether average response time changes with variation in load. For example, does the average response time change consistently with increasing load? If it does not, then load does not affect performance. If it does, then network performance is examined at 506 based on the data from the data instrumentation systems 414. Then item 500 then determines if the network affects the response time 506. If it is determined that the network affects the response time 506, then the system returns that there is a network bottleneck 508. However, it is possible that bottlenecks may exist in both the network and the Application under Test. A determination is therefore made at 510 as to whether combined effects are possible. If it is determined that the Application under Test is not involved at 512, metrics only are displayed in the graphical reporting 522. While any form of graphical reporting 522 may be displayed, in some embodiments, the graphical reporting 522 is a heatmap. If it is determined that at 506 that the network does not affect the response time or combined effects are possible 510, the metric relevant for response time increase is identified 514. From the identification of the relevant metric 514, the relevant sector for response time increase 516 is identified and critical load levels established 518. The information regarding the relevant source, metric, sector and loads are then displayed via graphical reporting 522 and suggestions for optimization are offered.

Figure 6:
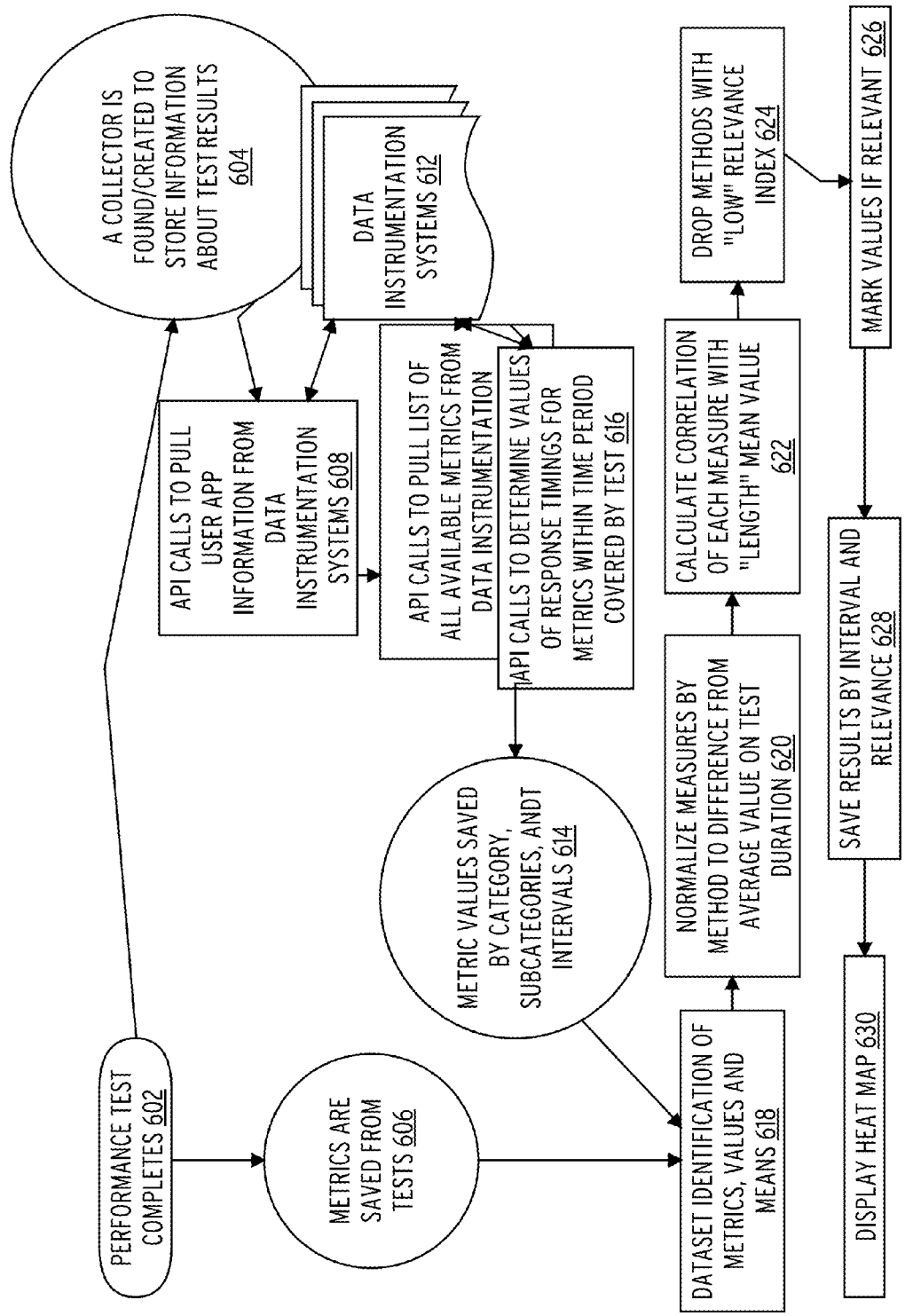
FIG. 6 is a detailed diagram of an implementation of a cloud based performance analytics system.

For example, as shown in FIG. 6, once the performance test completes at 602, the metrics are saved from tests 606 and a collector is found/created to store information about test results 604. Data from one or more Data Instrumentation Systems is retrieved through APIs. The APIs communicate with the data instrumentation systems 612 and the API calls to pull list of all available metrics from data instrumentation systems 610. Information on the Application 608 and on the metrics available 610 are used together with specific values such as, but not limited to, overall response time, time to first byte, connection time, ssl time, redirect time, prebackend time and other values related to the system during the time the test was performed at 616. All data 608, 610, 616 from the data information system are combined at 614. Data from the data information system 612 and data coming from the test execution metrics are combined at 618. Values from a plurality of test execution metrics and the data instrumentation systems are normalized to match the timing in the average test duration 620. Correlations between metrics and average page load time are calculated at 622. In some embodiments, this allows for the identification of system variations related to performance variations during the test. Given the threshold value for each metric and their intrinsic variability measured during the test, through statistical test of significance of the difference, interval of values of the variables are identified. The intervals identify ranges where the metrics are significantly below the threshold, similar to the threshold or significantly higher than the threshold. In some embodiments, it may be desirable to filter the metrics, for example to remove metrics with low relevance so that only highly correlated values considered. At 624, filtering according to various criteria may be instituted to remove metrics such as, but not limited to, those with low relevance, slice metrics for a particular time point, process metrics that meet particular criteria selected by the user and/or pre-selected criteria and the like. Relevant values are marked based on mean, threshold and distribution at 626 and final results are saved at 628. The results may then be displayed in a heatmap 630.

Figure 7:
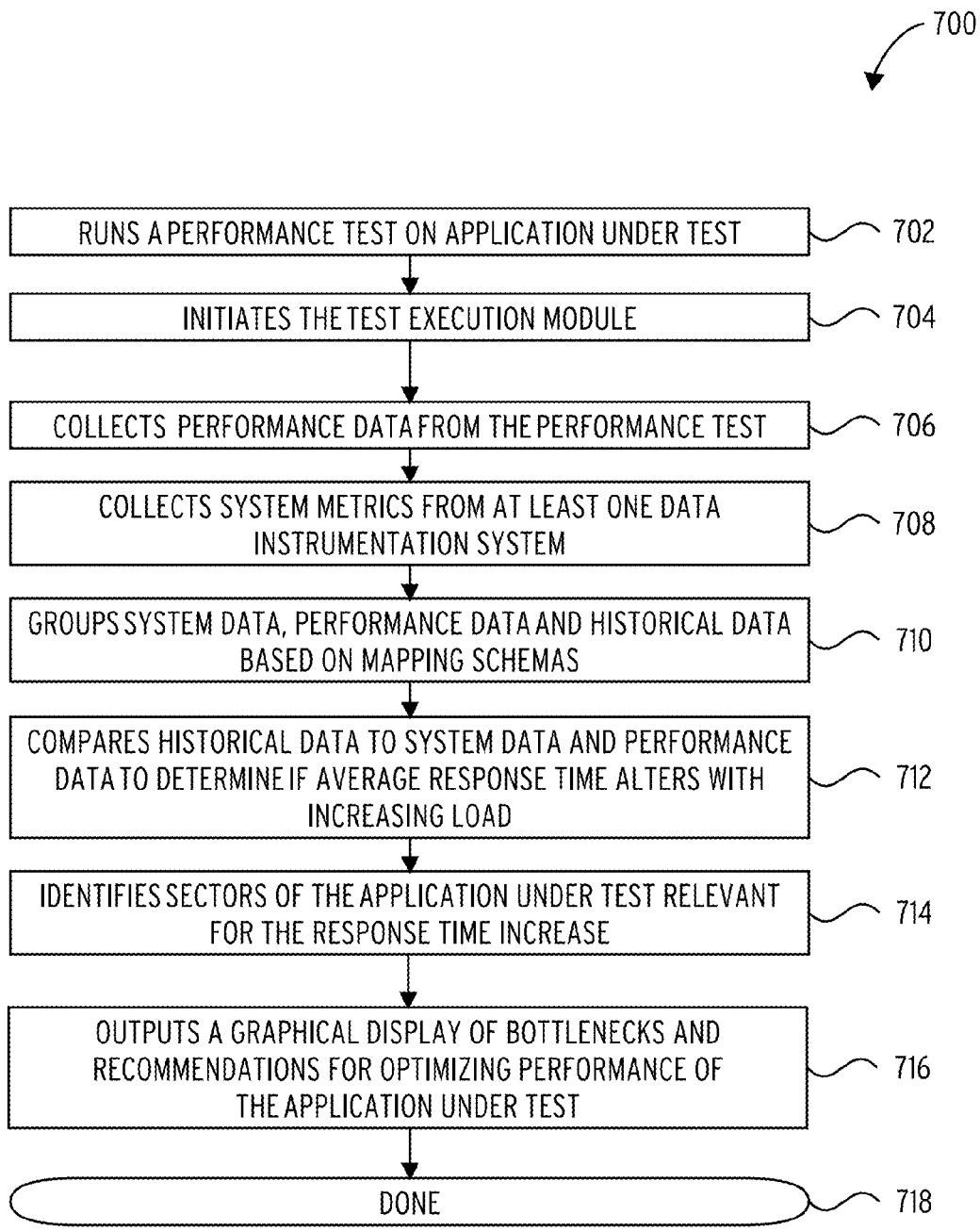
FIG. 7 illustrates a routine for detecting performance bottlenecks in an Application under Test in accordance with one embodiment.

As shown in FIG. 7, the system runs a performance test on Application under Test 702 and initiates the test execution module 704. The system then collects performance data from the performance test 706 and collects system metrics from at least one data instrumentation system 708. It groups system data, performance data and historical data based on mapping schemas 710, and compares historical data to system data and performance data to determine if average response time alters with increasing load 712. If it determine that average response time alters with increased load, the system identifies sectors of the Application under Test relevant for the response time increase 714 and outputs a graphical display of bottlenecks and recommendations for optimizing performance of the Application under Test 716 and then ends 718.

Figure 8:
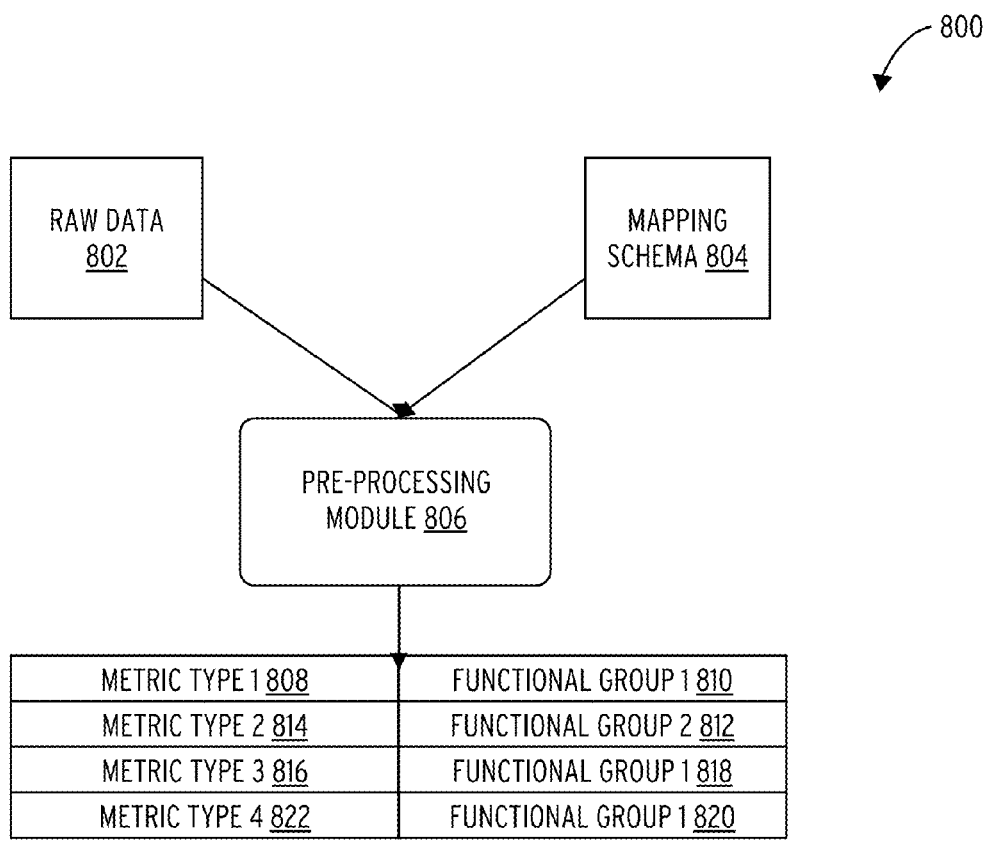
FIG. 8 is a flow chart of pre-processing and grouping of raw values and data into functionality datasets based on mapping schema predefined by a user.

As shown in FIG. 8, raw data 802 such as data from the operating system, different stacks, different levels of stacks, the cloud and the like is combined with mapping schema 804 based on the Data Instrumentation System and created on the metrics the system provides and the logical components that make up the stack and cloud infrastructure. Such mapping schema may be automated and applied as needed once created. The raw data 802 is sorted in the pre-processing module 806 according to the metrics of the mapping schema 804 with each functional group block 810, block 812, block 818 and block 820 of the raw data 802 assigned to the relevant metric type block 808, block 814, block 816, and block 822 respectively. For example, all raw data 802 may be mapped to one metric type. All raw data 802 relating to a plug-in may be mapped to another metric type. All raw data 802 related to a browser may be mapped to a third metric type until all raw data 802 is mapped to the appropriate metric.

Figure 9:
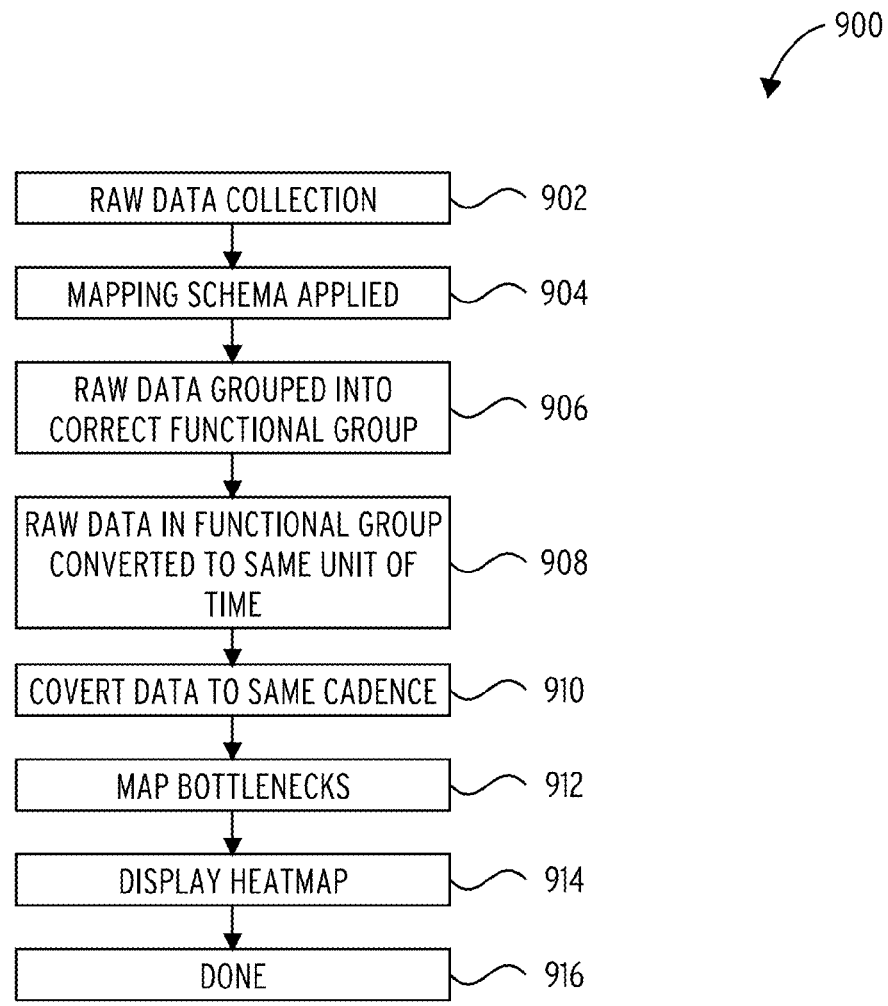
FIG. 9 illustrates an aspect of pre-processing according to an embodiment described herein.

As shown in FIG. 9, raw data is collected at block 902. Raw data may be from one or more sources including, but not limited to, the Application under Test, the browsers, one or more Data Instrumentation Systems, the cloud, the operating system, different stacks, different levels of stacks and the like. Predefined mapping schema block 904 are then applied to the data at block 904 and the raw data are grouped into the correct functional groups at block 906 attached to a specific metric type. The data is then converted to the same unit of time at block 908 and the same cadence at block 910. Performance bottlenecks are then mapped block 912, and a heatmap displayed at block 914 indicating the locations of bottleneck issues in the Application. The routine then finishes at block 916.

Figure 10:
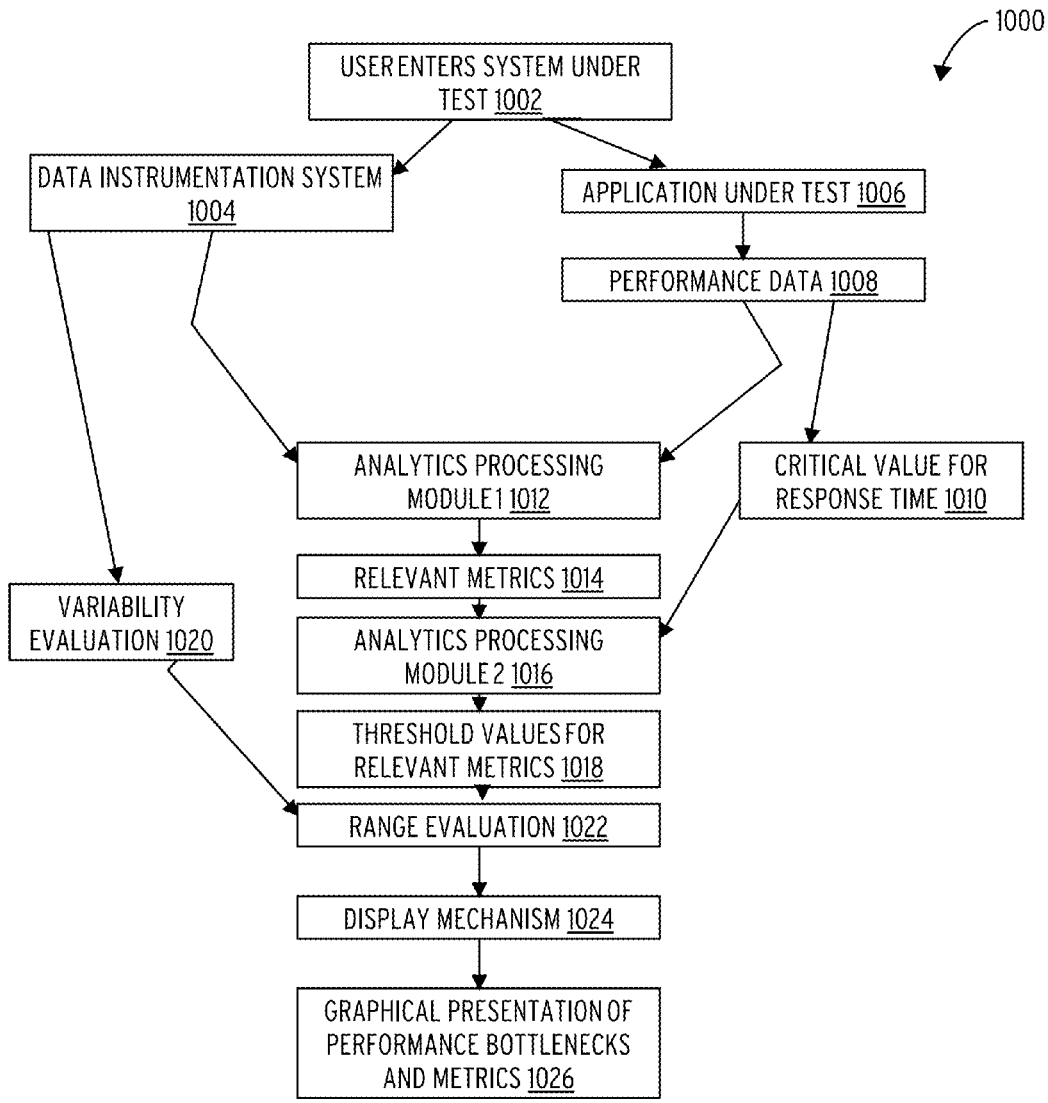
FIG. 10 is a chart illustrating the analysis of metrics collected from data instrumentation systems and performance tests in a system running an Application under Test.

As shown in FIG. 10, a user enters system under test 1002. Performance data 1008 are generated from a performance test on the Application under Test 1006 and analyzed with data from data instrumentation system 1004 by analytics processing module 1 1012. The analytics processing module 1 1012 identifies the relevant metrics 1014 representative of system timing and performance. The relevant metrics 1014 and the critical value for response time 1010 are subject to further analysis by analytics processing module 2 1016. The critical value for response time may be identified either by direct input from the user or automatically as a fraction of the total variation of the response time during the performance test. Using the critical value for response time 1010 and the relevant metrics 1014, threshold values for relevant metrics 1018 are determined. The variability of the data from the data instrumentation system 1004 measured during the test is statistically analyzed for significance of the difference and interval of values of the metrics identified in variability evaluation 1020. The information from the variability evaluation 1020 and threshold values for relevant metrics 1018 are combined and the ranges of the metrics evaluated at range evaluation 1022. The metrics are determined to be normal, of concern (warning) or critical) over the time of the performance test and the data is presented on a display mechanism 1024 in a graphical presentation of performance bottlenecks and metrics 1026. In some embodiments, the system may additionally output recommendations for optimizing performance.

Figure 11:
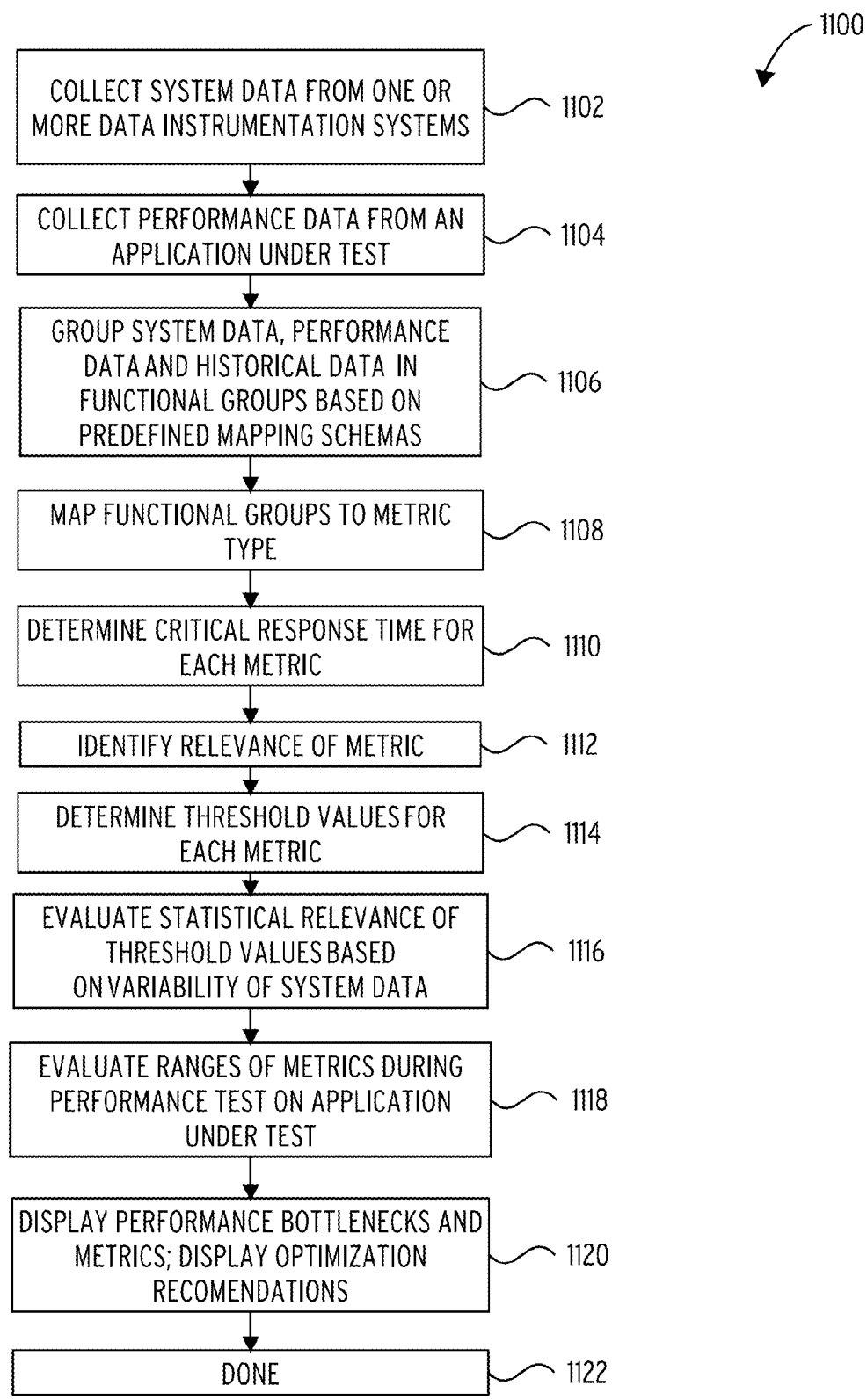
FIG. 11 illustrates a method of analyzing data collected from a system in which an Application is under Test to identify bottlenecks and other relevant metrics for the functioning of the application in the cloud.

As shown in FIG. 11, system data is collected from one or more Data Instrumentation Systems at block 1102. Performance data from an Application under Test is collected at block 1104. The system data, performance data and historical data are grouped into functional groups according to the metric type determined by the one or more Data Instrumentation Systems and based on the metrics that that system provides and the logical components that make up the stack and cloud infrastructure. Each functional group is mapped to a metric type at block 1108. In some embodiments, the performance data may come from one or more different components of the system such as, but not limited to, the cloud, the operating system, the browser, different stacks, and/or different levels of stacks. The critical response time for each metric is either entered by direct input by the user or determined as a fraction of the total variation of the response time during the performance test at block 1110. Metrics are evaluated for relevance at block 1112 either through an analytical approach by calculating the correlation or the methods of longitudinal analysis or through heuristic methods of machine learning. The metrics identified as relevant are then used to develop a mathematical multivariate predictive model for the response time which is used to determine the threshold values of the metrics associated with critical response times at block 1114. The threshold values are evaluated for statistical relevance based on the variability of system data at block 1116 and the ranges of the metrics over the length of the performance test of the Application under Test are evaluated as normal, concerning (warning), or critical at block 1118. The resulting metrics and bottlenecks are displayed at block 11120 and the analysis ends at block 1122.

Figure 12:
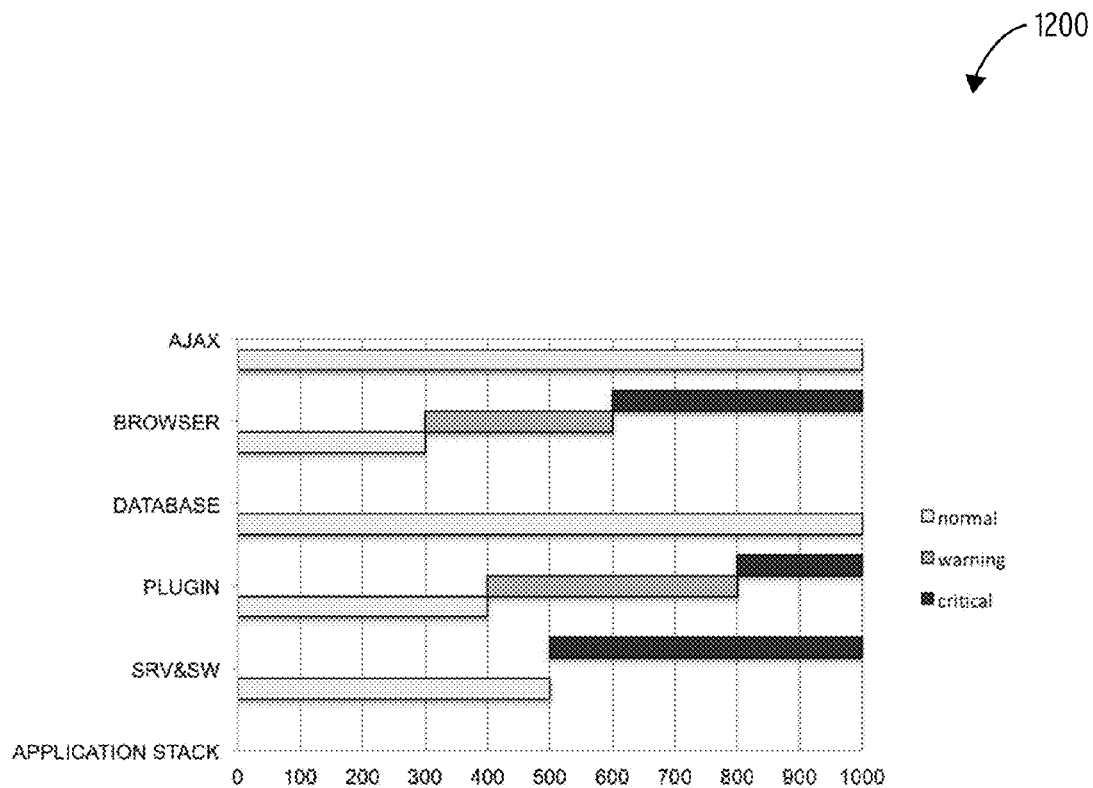
FIG. 12 is an example of a heatmap showing the results a user will see after using the systems and methods described herein to identify performance bottlenecks.

As shown in FIG. 12, a heatmap is produced showing the identified sectors of the Application under Test relevant for the response time increases. The horizontal access represents the time over which the performance test was executed. The vertical access shows the functional groups, based on the mapping schema used for that specific Data Instrumentation System. Each row represents the correlation of the response times for each metric in each functional group collected during the test run. FIG. 12's exemplary results were produced by New Relic for Ruby on Rails. AJAX maps to AJAX and BJAX calls. BROWSER maps to metrics related to browser, enduser, supportability, web frontend, derived, and AJAX. Database maps to metrics related to view, controller, activerecord, middleware, HTTP dispatcher, memcache and mongrel. PREBACKEND maps to metrics related to dns_time, connection_time, ssl_time and prebackend_time. The mapping schema grouped more than 100 different metrics into six groups:

AJAX: the response times of AJAX calls performed during the test run.
BROWSER: page load times recorded from the browser.
DATABASE: times for database requests.
PLUGIN: time spent in requests to third party software external to the application made by the application while running.
SRV & SE: time spent on infrastructure services such as middleware, cache and the like.
APPLICATION STACK: time spent executing methods directly from the Application.

As shown in FIG. 12, critical issues were found in page load times, connecting with third party software and in infrastructure services while the response times of AJAX and the database requests ran as expected. While FIG. 12 shows an example produced by New Relic for Ruby on Rails, other components may be measured that refer to PHP stack, Node.js stack, .NET stack, JAVA stack and the like.

Figure 13:
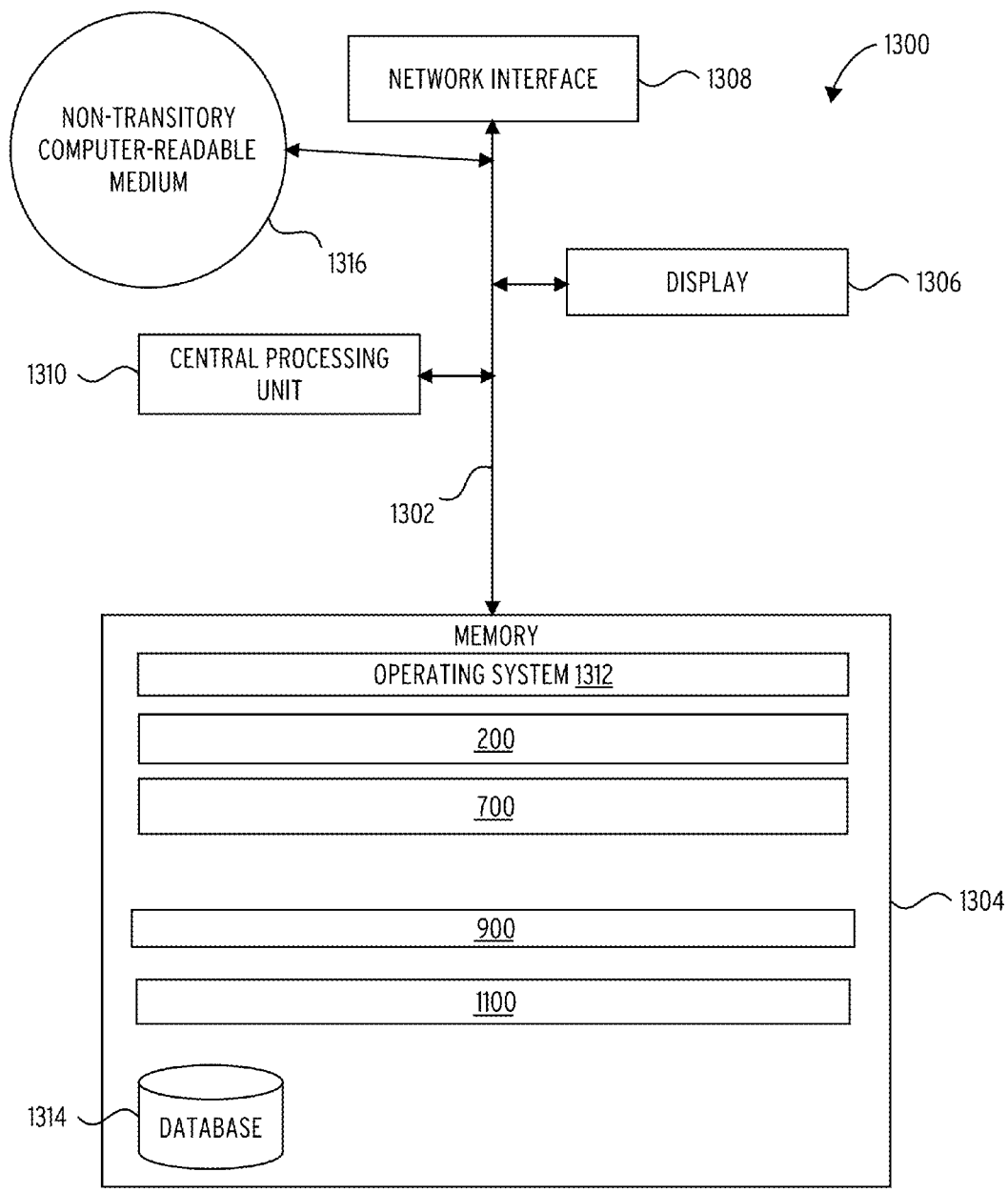
FIG. 13 illustrates a system 1300 in accordance with one embodiment.

FIG. 13 illustrates several components of an exemplary system 1300 in accordance with one embodiment. In various embodiments, system 1300 may include a desktop PC, server, workstation, mobile phone, laptop, tablet, set-top box, appliance, or other computing device that is capable of performing operations such as those described herein. In some embodiments, system 1300 may include many more components than those shown in FIG. 13. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1300 may comprise one or more physical and/or logical devices that collectively provide the functionalities described herein. In some embodiments, system 1300 may comprise one or more replicated and/or distributed physical or logical devices.

In some embodiments, system 1300 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1300 includes a bus 1302 interconnecting several components including a network interface 1308, a display 1306, a central processing unit 1310, and a memory 1304.

Memory 1304 generally comprises a random access memory ("RAM") and permanent non-transitory mass storage device, such as a hard disk drive or solid-state drive. Memory 1304 stores an operating system 1312, as well as other components such as routine 200, routine 700, routine 900 and routine 1100.

These and other software components may be loaded into memory 1304 of system 1300 using a drive mechanism (not shown) associated with a non-transitory computer-readable medium 1316, such as a floppy disc, tape, DVD/CD-ROM drive, memory card, or the like.

Memory 1304 also includes database 1314. In some embodiments, system 1300 may communicate with database 1314 via network interface 1308, a storage area network ("SAN"), a high-speed serial bus, and/or via the other suitable communication technology.

In some embodiments, database 1314 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

The techniques and procedures described herein may be implemented via logic distributed in one or more computing devices. The particular distribution and choice of logic may vary according to implementation. In some embodiments, a plurality of remotely distributed subscriber computers are connected to the internet. Requests from the plurality of remotely distributed subscriber computers are distributed through elastic load balancing, i.e., automatic scaling of request-handling capacity in response to incoming application traffic. Such requests may be concurrent, consecutive, or some combination thereof. The requests are then sent to a plurality of application servers, 1-x. The number of application servers may increase or decrease x times depending on the load received. The data received generates recommendations which are then applied to the Application under Test to improve resource utilization and allocation or other performance issues by the application under under test including re-allocation of bandwith and memory used by the Application under Test in response to changes in loads.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this Application, refer to this Application as a whole and not to any particular portions of this Application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one Application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Embodiments of an application performance testing system have been described. The following claims are directed to said embodiments, but do not preempt application performance testing in the abstract. Those having skill in the art will recognize numerous other approaches to application performance testing are possible and/or utilized commercially, precluding any possibility of preemption in the abstract. However, the claimed system improves, in one or more specific ways, the operation of a machine system for application performance testing, and thus distinguishes from other approaches to the same problem/process in how its physical arrangement of a machine system determines the system's operation and ultimate effects on the material environment. The terms used in the appended claims are defined herein in the glossary section, with the proviso that the claim terms may be used in a different manner if so defined by express recitation.

What is claimed is:
1. A system for identification and classification of performance bottlenecks in web applications comprising:
at least one data instrumentation system which collects system data from a software stack, wherein the data from the at least one data instrumentation system is retrieved through at least one API;
wherein the at least one API retrieves all available metrics from the at least one data instrumentation system;
a plurality of servers, wherein each server comprises a processor, a storage, and a non-transitory memory for executing one or more modules, wherein the modules comprise:
a test execution module to generate synthetic traffic, run a performance test on an Application under Test and collect raw data from execution of the performance test;
a pre-processing module which groups the raw data from a data instrumentation system, the performance test, and historical data into functional groups based on mapping schema generated by the at least one data instrumentation system;
wherein the mapping schema maps the data from the pre-processing module to a specific metric representative of the functional groups' role in system timing and performance;

an analytics processing module which compares the functional groups assembled by the pre-processing module and identifies a threshold of a relevant metric associated with a performance bottleneck;

a plurality of classification modules which identify a sector in the Application under Test that is more highly impacted by changes in load;

wherein system variations related to a performance variation during the performance test are determined by correlating the relevant metrics and an average page load time; and wherein the relevant metrics are identified based on mean, threshold and distribution; and a display mechanism that provides a graphical representation of the performance bottlenecks, metrics, and recommendations for optimizing performance of the Application under Test.

2. The system of claim 1, in which the raw data from the performance test and the at least one data instrumentation system are normalized to match a timing of a performance test duration.

3. The system of claim 1, wherein metrics with low relevance are dropped so that only highly correlated values are considered.

4. The system of claim 3, wherein the metrics with low relevance are determined heuristically.

5. The system of claim 3, wherein the metrics with low relevance are determined using a multivariate predictive model for response time.

6. The system of claim 1, wherein the graphical representation is a heatmap.

7. A method of identifying performance bottlenecks in web Applications under Test comprising:

a plurality of servers, wherein each server comprises a processor, a storage device, and a non-transitory memory for executing one or more modules configured to execute instructions, wherein the executed instructions comprise:

collecting system data from one or more data instrumentation systems;

collecting performance metrics from an Application under Test;

grouping the system data, the performance metrics, and historical data in functional groups based on pre-defined mapping schemas generated by the one or more data instrumentation systems, wherein the mapping schemas map the grouped data to a specific metric representative of the functional groups' role in system timing and performance;

normalizing the grouped data to match timing of the Application under Test;

determining if an average response time alters with increasing load;

determining if the system data affected performance;

calculating metrics relevant for response time increase;

identifying a sector of the Application under Test relevant for response time increase;

evaluating critical load levels; and outputting a graphical representation of bottlenecks and recommendations for optimizing performance of the Application under Test.

8. The method of claim 7, wherein the system data is retrieved from an API.

9. The method of claim 7, wherein a correlation between the metrics and an average page load time is calculated to identify system variations related to system performance variations during a test.

10. The method of claim 7, wherein metrics with low relevance are dropped.

11. The method of claim 7, wherein relevant metrics are identified based on mean, threshold, and distribution.

12. The method of claim 7, wherein the graphical representation is a heatmap.

* * * * *